United States Patent

Lindsay

Patent Number: 5,308,375
Date of Patent: May 3, 1994

[54] PROCESS FOR RECOVERY OF FREE ALUMINUM FROM ALUMINUM DROSS OR ALUMINUM SCRAP USING PLASMA ENERGY WITH OXYGEN SECOND STAGE TREATMENT

[75] Inventor: Richard D. Lindsay, Brentwood, Tenn.

[73] Assignee: Plasma Processing Corporation, Millwood, W. Va.

[21] Appl. No.: 901,723

[22] Filed: Jun. 22, 1992

[51] Int. Cl.⁵ .............................................. C22B 4/02
[52] U.S. Cl. ...................................... 75/10.21; 75/672
[58] Field of Search .............................. 75/10.21, 672

[56] References Cited

U.S. PATENT DOCUMENTS 4,960,460 10/1990 Dube et al. .................. 75/10.21
4,997,476 3/1991 Lindsay et al. .............. 75/10.21

Primary Examiner—Melvyn J. Andrews
Attorney, Agent, or Firm—Breiner & Breiner

[57] ABSTRACT

A process for recovering free aluminum and aluminum compounds such as aluminum oxide from aluminum dross and aluminum scrap in a furnace heated with a plasma arc torch followed by oxygen injection after significant aluminum separation has occurred is described. The injected oxygen reacts with aluminum nitrides and unrecoverable aluminum in the dross to provide processing energy. High aluminum recovery is obtained with greatly reduced cycle times at lower overall operating costs.

8 Claims, 3 Drawing Sheets

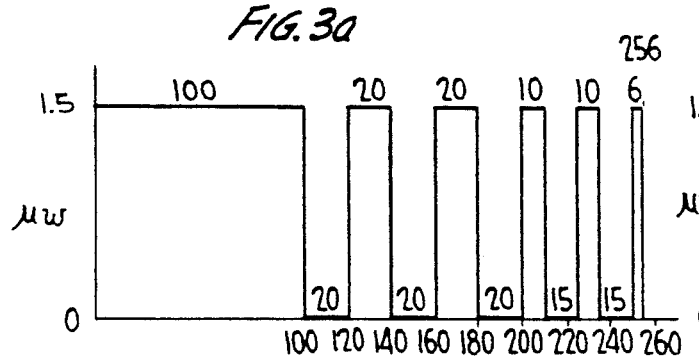
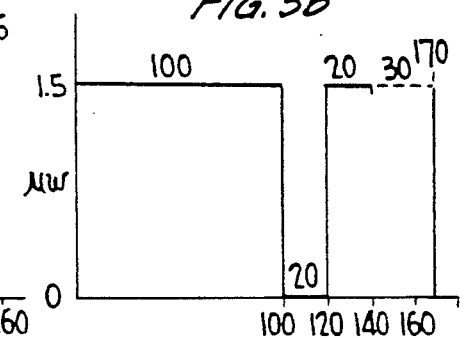
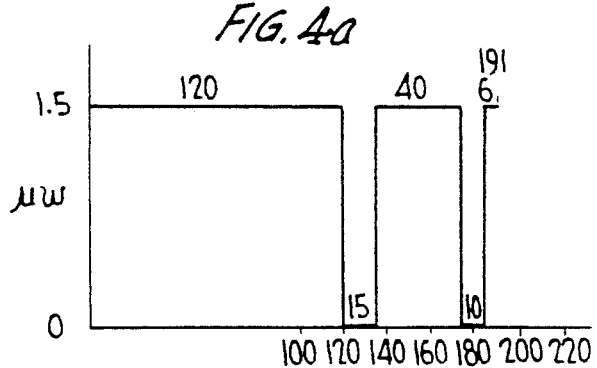
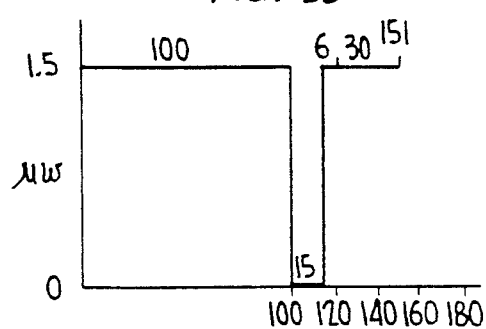
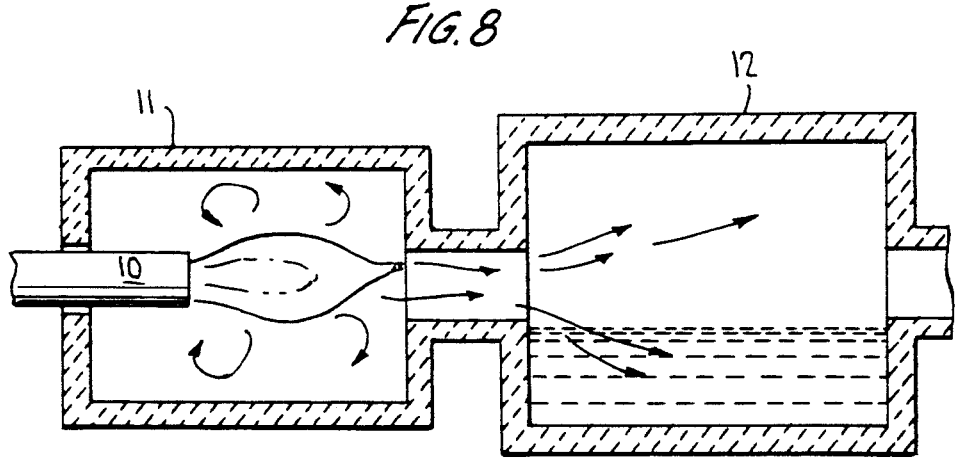

PROCESS FOR RECOVERY OF FREE ALUMINUM FROM ALUMINUM DROSS OR ALUMINUM SCRAP USING PLASMA ENERGY WITH OXYGEN SECOND STAGE TREATMENT

RELATED PATENTS

This application is related to Lindsay, U.S. Pat. No. 4,877,448 based on application Ser. No. 281,049 filed Dec. 8, 1988.

FIELD OF THE INVENTION

This invention relates to the recovery of aluminum from aluminum dross or aluminum scrap, such as aluminum cans, using a plasma arc torch. More particularly, the invention relates to a process for the recovery of aluminum metal from aluminum dross and aluminum scrap in a furnace heated with a plasma arc torch operated on air, or other oxidizing arc gas, using an oxygen second stage treatment. Surprisingly, by using second stage oxygen treatment short term power inputs are achieved, greatly reducing both the plasma power time and total cycle time.

BACKGROUND OF THE INVENTION

When a body of aluminum is melted in a furnace for purposes of casting or the like, dross forms on the surface of the molten aluminum and must be periodically removed, for example by skimming or similar operation. The removed dross generally contains substantial amounts of free aluminum as well as aluminum oxides and certain other metals and metal salts, such as magnesium, manganese, and lithium depending on the nature of the aluminum or aluminum alloy being treated.

U.S. Pat. No. 4,877,448 discloses a process for the recovery of free aluminum and aluminum oxides from aluminum dross and aluminum scrap (hereinafter, for convenience, collectively referred to as "dross" or "aluminum dross") comprising heating the dross in a high temperature furnace using a plasma arc torch fed with air, or other oxidizing gas such as a mixture of air and oxygen or air and nitrogen as the arc gas. The use of air as the arc gas in comparison to nitrogen provides greater heat output with the same electrical input (KW/hr), resulting in a shorter processing time and substantially higher throughputs. Moreover, nitride formation is reduced since the hottest part of plasma which is closest to the torch is oxidizing, not nitriding. The oxide, $Al_2O_3$, which is formed is stable and not an environmental problem. The process is more economical since air is much cheaper than nitrogen or argon, or any other available inert arc gas.

Dross recovery systems of the type using air as the arc gas have conventionally utilized two furnaces, i.e., furnaces 1 and 2, each equipped with a separate plasma torch. However, to avoid excessive installation costs and high electrical energy requirements, the system is designed in order that only one of the torches is lit off or operated at any given time. Thus, in operation one of the two furnaces is charged with dross and thereafter the plasma torch lit off, and the dross in furnace 1 undergoes treatment for recovery of free aluminum. During the operation of furnace 1, furnace 2 is charged with dross; and as soon as the cycle time is completed in furnace 1, which requires approximately 4 hours, the plasma torch at furnace 1 is shut down and the plasma torch at furnace 2 is lit off. The dross in furnace 2 is then processed, again requiring approximately a 4 hour cycle time. During the processing of the dross in Furnace 2, the free aluminum and the non-metallic by-products (NMP) are removed from furnace 1, with furnace 1 then being again charged with dross for a further aluminum recovery cycle once the dross in furnace 2 is completely processed.

In the conventional process as above described, in order to maintain the internal furnace temperature and the temperature of the dross being treated in the desired temperature range, the plasma torch is initially fired followed by a sequence of shutting the torch down and relighting the torch. Thus, the need to have alternative firing followed by a period of shutdown is a result of the plasma from the torch being hotter at its core, i.e., about 12,000° C., than at its outer surface, i.e., about 1,000° C., with varying temperatures in between the core and outer surface. This hot core of the plasma, although believed desirable since it is believed to enhance the cracking of the dross shell surrounding free aluminum, leads to overheating if a sequence of alternate firing and non-firing of the torch is not used. During the time when the torch is not lit off, it is necessary to flood the furnace with an inert gas such as argon. The use of this procedure substantially lengthens the cycle time, and additionally the cost of argon gas used in the process is relatively expensive.

Accordingly, although the process as defined in U.S. Pat. No. 4,877,448 operated as above described is a highly desirable process, there is need for improvement in the process, particularly in reducing cycle time.

SUMMARY OF THE INVENTION

It has been found according to the present invention that after the initial stages of the dross treatment process, that is, when significant amounts of aluminum separation have been achieved from aluminum dross, it is possible to take advantage of the exothermic oxidation of aluminum nitride or unrecoverable aluminum in the dross being treated to greatly reduce process time and to enhance aluminum recovery. This is achieved by shutting down the energy source, such as a plasma torch, to the furnace after significant amounts of aluminum are separated from the dross and directly injecting oxygen ($O_2$) into a processing furnace, in controlled amounts, preferably through a plasma torch.

Thus, typical drosses which are charged to the furnaces will contain 3% to 12% aluminum nitride. After removing aluminum, the nitride content will increase to 5% to 24%. The residual aluminum content of the dross will be 3% to 7%. The aluminum nitrides, considered to be undesirable since they lead to ammonia emissions in drosses and nonmetallic by-products (NMP) from the dross treatment, are advantageously utilized according to the present invention. Thus, after the dross charge has been treated for a period of time, the aluminum nitrides and unrecoverable aluminum are oxidized to aluminum oxide by the direct addition of $O_2$ into the furnace, providing useful processing energy. This improves the aluminum recovery, dramatically lowers processing cost and increases dross throughput.

Specifically, in a typical process using plasma energy only, the furnace after being charged with aluminum dross is fired with the plasma torch for a period of about 100 minutes. To stabilize and control the temperature within the furnace as above considered, the firing is then discontinued for a period of 20 minutes, at which time the furnace is flooded with argon gas. This is followed by firing the torch an additional 20 minutes, shutting the torch down for an additional 20 minutes, firing the torch an additional 20 minutes followed by shutting the torch down for 20 minutes, firing the torch for 10 minutes and shutting the torch down for 15 minutes, firing for 10 minutes, shutting the torch down for 15 minutes, and then firing the torch an additional 6 minutes. By this sequence of firing and not firing the torch, the temperature of the dross is controlled with the plasma temperature being sufficiently intense so as to crack the dross shell surrounding the free aluminum within the dross. The typical cycle comprises 256 minutes, where 166 minutes is actually firing the plasma torch furnace and for 90 minutes the torch is shut down with the furnace being flooded with an inert gas, such as argon. According to the present invention, the cycle time can be reduced to 135-170 minutes for a saving of 86-121 minutes. Thus, the torch is initially fired for 60-100 minutes followed by about 20 minutes of having the torch shut down and then firing for an additional 20 minutes. The additional firing of 20 minutes is followed by oxygen injection for 10-45 minutes. At the end of the 10-45 minute oxygen injection, the aluminum is recovered in slightly better yields than when using plasma only. Moreover, the process time is greatly reduced.

Although the alternate firing and shutting the torch down is an effective way to maintain controlled temperature within the furnace and the effective removal of free aluminum from dross, it has now been found possible to achieve substantially similar results by causing the plasma coming from the torch to enter a plenum where the plasma energy is thoroughly mixed so that the plasma will have a uniform temperature of about 5,000° C. This plasma with uniform temperature is then applied directly to the dross within the furnace. By using the plenum, it is possible to reduce the cycle time in a typical run using plasma only from 256 minutes, i.e., 166 minutes of plasma firing and 90 minutes of argon feed, to 166 minutes of plasma feed and only 25 minutes of argon feed. The utilization of the oxygen injection according to the present invention will limit the firing with plasma to 106 minutes, 15 minutes of argon feed and 30 minutes of oxygen feed.

Accordingly, by utilizing the oxygen addition which oxidizes the aluminum nitride and unrecoverable aluminum, the plasma torch can be shut down and the dross recovery in the furnace will proceed without additional plasma energy input. This, then, greatly reduces both the plasma power time and the total cycle time.

THE DRAWING AND DETAILED DESCRIPTION

A presently preferred embodiment will be described in reference to the drawing wherein FIG. 1 is a flow diagram of a dross treatment process using plasma energy only;

FIG. 2 is a flow diagram of a dross treatment process of the present invention using plasma energy followed by $O_2$ injection;

FIGS. 3(a) and 3(b) are comparative time-energy graphs using, respectively, plasma only and plasma followed by oxygen injection in a first embodiment according to the present invention;

FIGS. 4(a) and 4(b) are comparative time-energy graphs again using, respectively, plasma only and plasma followed by oxygen injection according to a second embodiment of the present invention.

FIG. 8 illustrates a plenum box constructed and arranged with the plasma torch.

Figure 1:
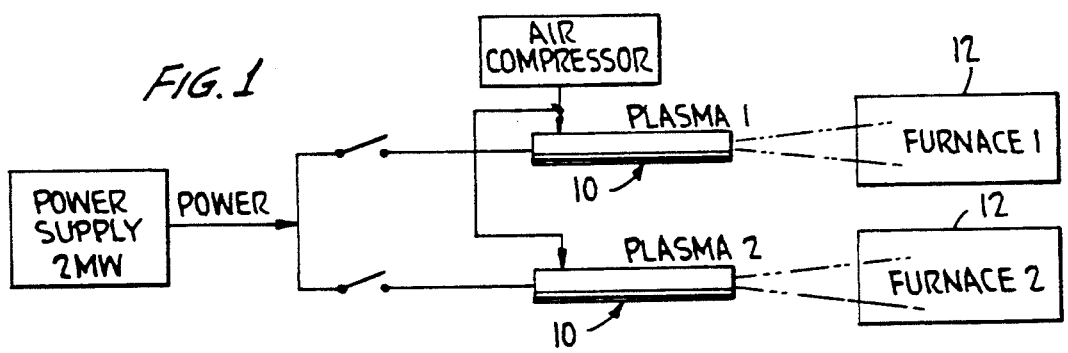

Referring to FIG. 1, in a comparative process as disclosed in U.S. Pat. No. 4,877,448, 2.5 tons (5,000 pounds) of aluminum dross containing approximately 50% aluminum are weighed and charged into furnace 1. After charging the dross to furnace 1, a PT250N plasma arc torch 10 manufactured by the Plasma Energy Corporation is brought into position in the furnace and the dross heated to the molten state using plasma torch 10 with air as the arc gas. The alternate firing and off period of the torch is illustrated in FIG. 3(a). As shown in FIG. 3(a), the total cycle time is 256 minutes, and of that total time the plasma torch in on for 166 minutes and off for a period of 90 minutes. During the time that the torch is off, i.e., 90 minutes, argon at a flow rate of 50 SFC/min is flooded over the furnace charge (SCF=standard cubic foot).

The process was repeated using the improvement of the present invention and the cycle as illustrated in FIG. 3(b). Thus, after an initial firing of the plasma torch for 100 minutes the torch was shut off for 20 minutes. The torch was then fired an additional 20 minutes and shut down, followed by oxygen addition for 30 minutes. This completes the processing. The oxygen is injected through the plasma torch to provide controlled addition. Heretofore it was believed that it was dangerous to inject oxygen directly into a heated furnace. However, it has been found according to the present invention that there is no danger when the injection of the oxygen is in controlled amounts. The surface temperature of the furnace and the charge in the furnace is sufficiently high to cause immediate reaction of the controlled amount of oxygen injected. There is, therefore, no buildup of oxygen in the furnace.

As illustrated in FIGS. 3(a) and 3(b), the total cycle time when utilizing the present invention is reduced from 256 minutes to 170 minutes. Of that total time, the plasma torch is on for 120 minutes in comparison to 166 minutes. Argon is flooded for a total of 20 minutes in comparison to 90 minutes. Oxygen is fed for a period of 30 minutes. Using a cost of electrical energy at 3 cents per kilowatt hour, an oxygen cost of $3.32 per 1,000 SCF, and an argon cost of $15 per 1,000 SCF, there is a saving in total operating costs of $75 per furnace charge. Additionally, in a twenty-four hour continuous operating period, more than a 65 percent increase in production is obtainable utilizing two furnaces and two plasma torches. It is also possible based on the present invention to utilize, in series, three or more furnaces. The limiting factor is in the time needed to charge the furnace and to empty the furnace at the end of the cycle recovering NMP and free aluminum.

The dross recovery process is again repeated. However, in this instance the torch design was modified to include plenum box 11 attached to the end of torch 10. The plasma from plasma torch 10 is completely mixed in plenum box 11 so that all of the plasma has a uniform temperature of approximately 5,000° C. The plasma is then applied to the dross within the furnace utilizing a continuous application, as illustrated in FIG. 4(b). Thus, the total processing time is reduced from 256 minutes to 191 minutes. The torch is fired for a total of 120 minutes, followed by a 15 minute off period, followed by a 40 minute torch on period, a 10 minute off period, and a 6 minute on period, as illustrated in FIG. 4(a).

The process was again repeated. However, in this instance oxygen injection was utilized according to the cycle shown in FIG. 4(b). According to this cycle the plasma torch is on for 100 minutes, followed by a 15 minute off period and then a 6 minute on period, at which time the torch is shut down completely and oxygen is injected through the torch over a period of 30 minutes. As seen, the total processing time has been reduced from 191 minutes to 151 minutes. Of the 151 minutes, the torch is on for 106 minutes, argon is flooded for a period of 15 minutes, and oxygen injection is over a period of 30 minutes. Using the costs of electricity, oxygen and argon, as above stated there is a saving in total operating costs of $37 per furnace charge.

The amount of total oxygen which will be added during the processing is calculated to be sufficient to make up the energy needs for processing dross by reacting with some of the aluminum nitrides in the dross or formed during the processing of the dross and some of the unrecoverable aluminum. The exothermic reaction energy of oxygen and the nitrides and aluminum provides the essential processing energy for completing the dross recovery process while the plasma torch is shut off. It has been found that optimally 350-760 SCF of oxygen are required for each ton of dross having approximately 50% recoverable aluminum. The injection of oxygen into the furnace is controlled in order to avoid buildup of oxygen in the furnace and control the power input into the charge. The oxygen will generally be added over a period of 30 to 45 minutes in a furnace having a capacity of 10 tons. The oxygen flow is discontinued when the metal temperature reaches 1,275° F. to 1,400° F. depending on the type of dross processed.

Figure 6:
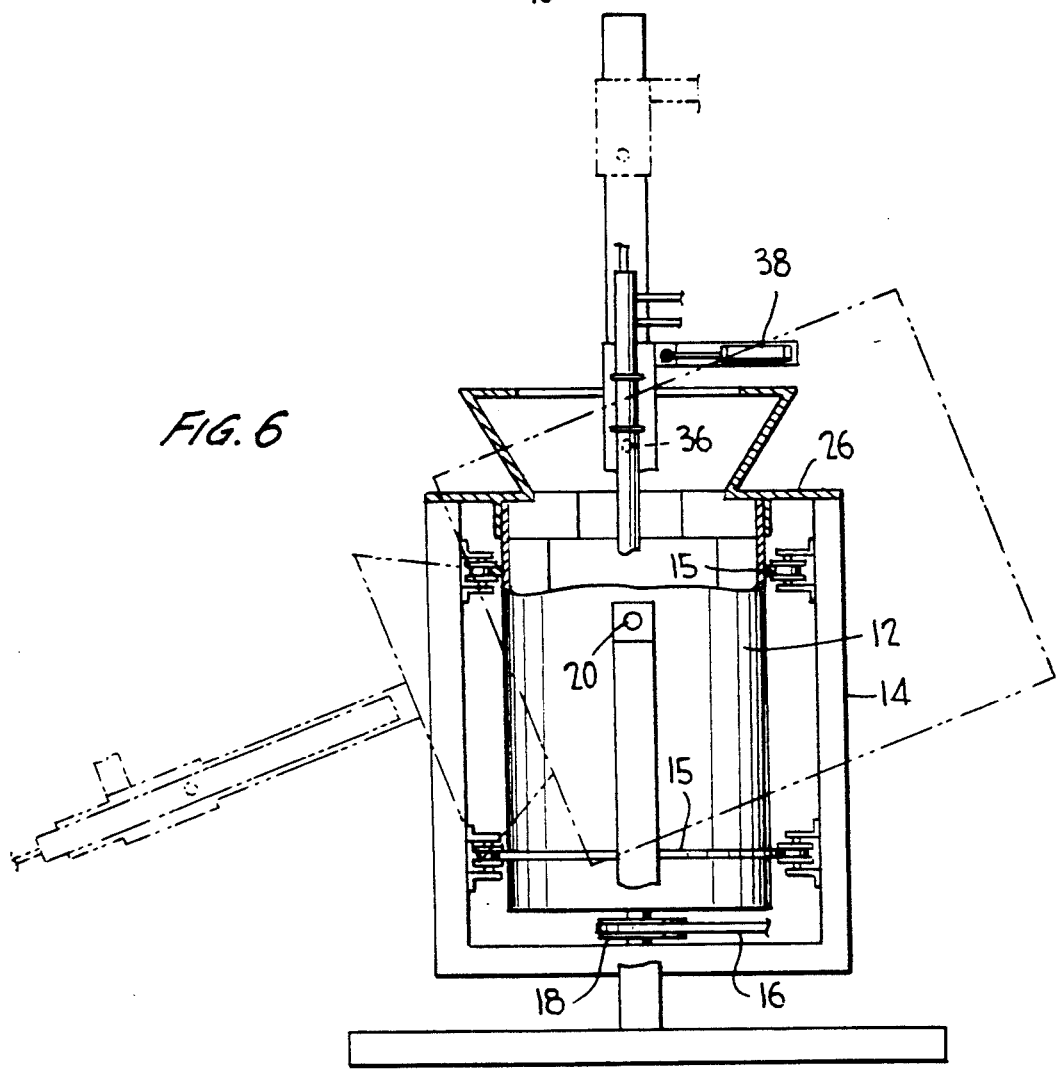
FIG. 6 is a side elevational view of the furnace and plasma torch shown in FIG. 3.
Figure 5:
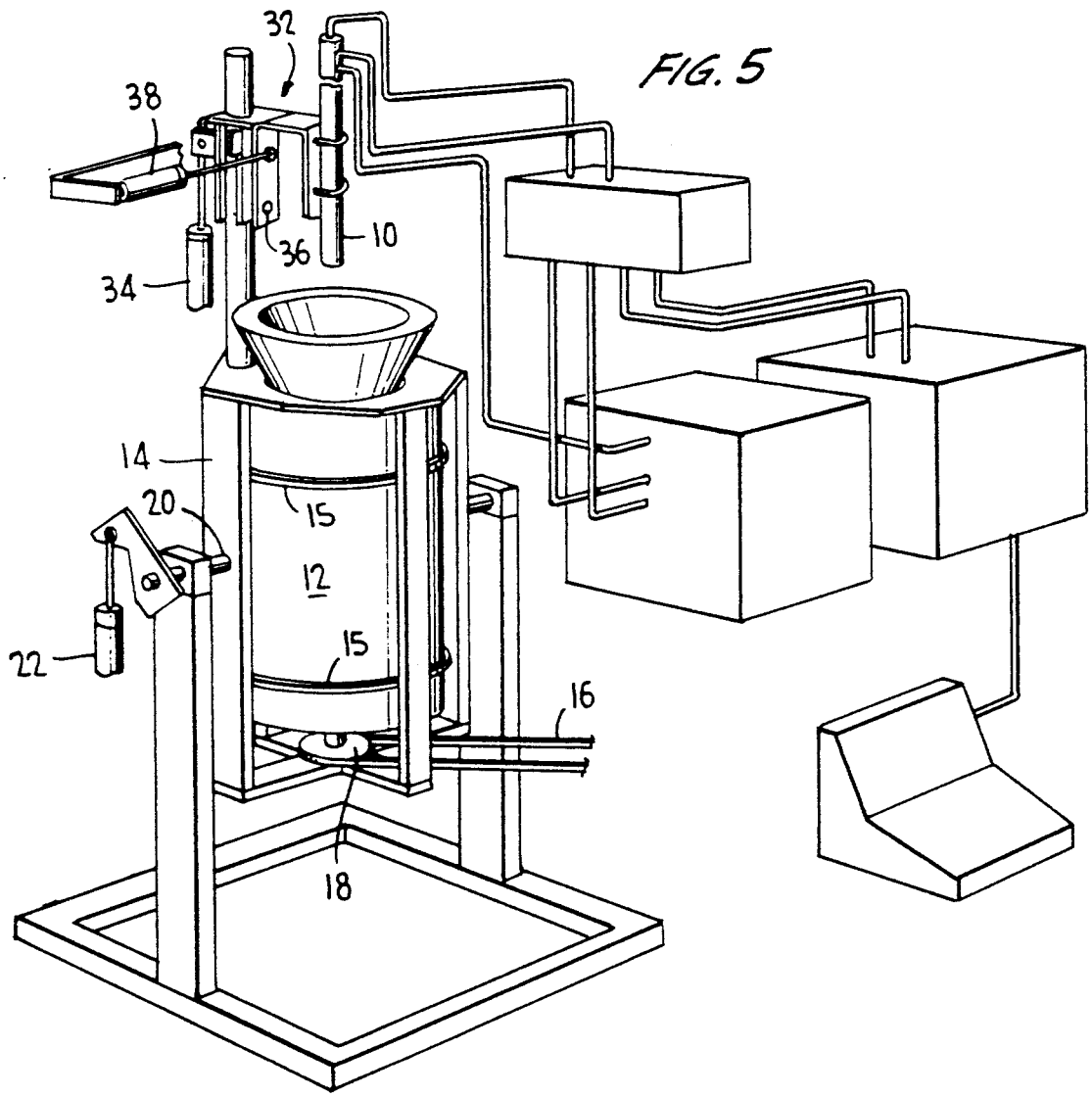
FIG. 5 is a schematic drawing of the furnace, plasma arc torch, and supply system used in the process of this invention.

While any furnace configuration can be utilized using either a transferred arc or a non-transferred arc plasma torch, the preferred furnace, as shown in FIGS. 5 and 6, is a tilting, rotating furnace with a non-transferred arc plasma torch. Thus the furnace comprises a rotating drum 12 on frame 14 which is driven on rails 15 by belt 16 and pulley 18 with an electric motor (not shown). As is also shown in FIGS. 5 and 6, the drum, carrying torch 10, tilts about pivot point 20 actuated by an air cylinder 22 to permit convenient recovery of the aluminum. Accordingly, the supply lines to the plasma torch must be flexible.

Plasma torch 10 is removably positioned in cover 26 of furnace 1 or 2. The torch on frame 32 is moved vertically into and out of position by an air cylinder 34. Once in position in the furnace, the torch can be swung back and forth within the furnace in order to cover the entire furnace area around pivot point 36 by activation of air cylinder 38. The torch is positioned independent of drum 12 to permit rotation of the drum.

Figure 7:
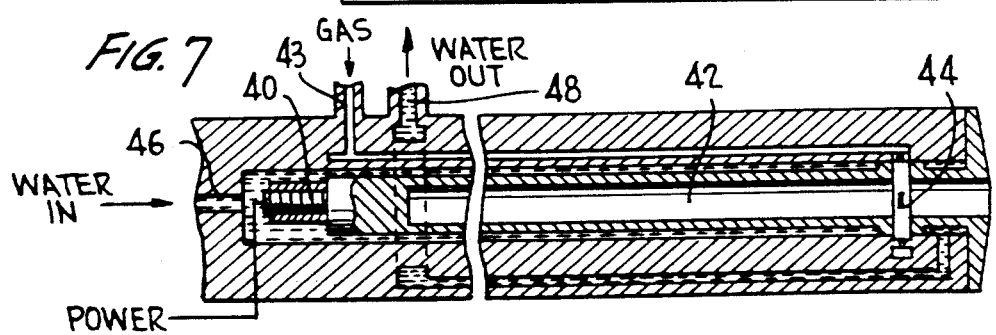
FIG. 7 is a schematic cross section of the plasma arc torch used in the present invention.
Figure 2:
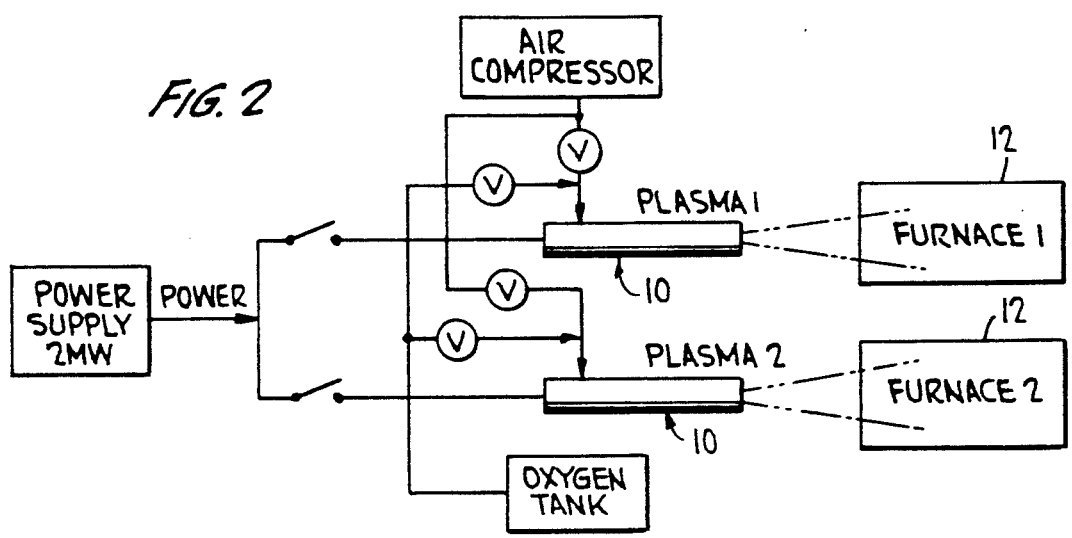

Plasma torches which are operable in the process of the invention are of the transfer and non-transfer type commercially available from Plasma Energy Corporation, Raleigh, North Carolina, or other vendors. Suitable torches are also described in Camacho, U.S. Pat. No. 4,383,820; and Camacho et al, U.S. Pat. No. 4,559,439. A simplified cross section of a suitable transfer arc torch is shown in FIG. 7 of the drawing. As illustrated, the torch designed for operating in the transferred arc mode includes an electrode 40, a collimator 42, a vortex generator 44, water input means 46 for cooling the torch mechanism, and a water output means 48. Gas input means 43 feeds gas to the vortex generator 44 between electrode 40 and collimator 42. In the plasma generator system the furnace base and the dross being heated function as the ground for receiving the transferred arc from electrode 40. As shown in FIG. 5, the water/gas manifold and the electrical power supply for the torch are supplied to a power/water junction box and then fed to the torch. The air arc gas is ionized between the vortex generator and the collimator.

In the preferred embodiments illustrated above, the aluminum dross is heated using a plasma arc torch which is a preferred manner of heating. However, the advantages obtained using oxygen injection will apply equally to furnace systems where the aluminum dross is heated with an alternate energy source such as a gas burner. Once the dross is heated to the point of obtaining significant aluminum separation, the energy source can be turned off and the process continued using oxygen injection. The oxygen again will react with the aluminum nitrides and unrecoverable free aluminum to provide the necessary processing energy.

As will be apparent to one skilled in the art, various modifications can be made within the scope of the aforesaid description. Such modifications being within the ability of one skilled in the art form a part of the present invention and are embraced by the appended claims.

It is claimed:

1. A process of recovering free aluminum from aluminum dross or aluminum scrap comprising charging aluminum dross or aluminum scrap to a furnace equipped with a plasma arc torch for heating said charge, heating said charge by providing plasma energy to said charge, continuing said heating with said plasma arc torch until said charge is molten and free aluminum is separated, thereafter discontinuing the plasma heating and injecting oxygen in a controlled amount to said charge.

2. The process of claim 1 wherein said plasma energy is generated by feeding air to said torch for ionization.

3. The process of claim 1 wherein said oxygen is injected through the plasma arc torch.

4. The process of claim 1 wherein the heating with plasma energy in a 10 ton furnace using a 1500 kw torch is for a period of from 60 to 156 minutes and oxygen injection is from 10 to 45 minutes.

5. The process of claim 4 wherein the heating with plasma energy is for a period of from 60-100 minutes and oxygen injection is from 30-45 minutes.

6. Method of treating dross with plasma comprising
 (a) supplying dross comprising free metal to a furnace;
 (b) providing plasma energy to heat said dross, said plasma of said plasma energy being thoroughly mixed to provide a plasma having a uniform temperature and contacting said dross with said plasma to heat said dross to thereby release free metal from within said dross; and
 (c) recovering said free metal from the furnace.

7. The method of claim 5 wherein step (b) is followed by discontinuing the heating of said dross with plasma after significant free metal is formed and oxygen is injected into the furnace for reaction to provide processing energy.

8. A process of recovering free aluminum from aluminum dross or aluminum scrap comprising charging aluminum dross or aluminum scrap to a furnace equipped with means for direct heating of said charge, heating said charge with said direct heating means until said charge is molten and free aluminum is separated, thereafter discontinuing said direct heating and injecting oxygen in a controlled amount to said charge.

* * * * *